(12) United States Patent
Hotta et al.

(10) Patent No.: US 8,385,180 B2
(45) Date of Patent: Feb. 26, 2013

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 122 days.

(21) Appl. No.: 12/404,824

(22) Filed: Mar. 16, 2009

(65) Prior Publication Data
US 2009/0231984 A1 Sep. 17, 2009

(30) Foreign Application Priority Data
Mar. 17, 2008 (JP) .................................. 2008-066959

(51) Int. Cl.
*G11B 7/00* (2006.01)
(52) U.S. Cl. ................................................. 369/112.03
(58) Field of Classification Search .................. None
See application file for complete search history.

(56) References Cited

U.S. PATENT DOCUMENTS

| | | | | |
|---|---|---|---|---|
| 6,324,133 | B1 * | 11/2001 | Ichimura | 369/44.27 |
| 6,728,193 | B1 * | 4/2004 | Uchizaki et al. | 369/112.01 |
| 6,977,782 | B2 * | 12/2005 | Maeda et al. | 359/819 |
| 7,411,883 | B2 * | 8/2008 | Kimura et al. | 369/112.03 |
| 7,821,905 | B2 * | 10/2010 | Saito et al. | 369/112.23 |

FOREIGN PATENT DOCUMENTS

JP 09-311271 12/1997

* cited by examiner

*Primary Examiner* — Joseph Feild
*Assistant Examiner* — Parul Gupta
(74) *Attorney, Agent, or Firm* — Fish & Richardson P.C.

(57) ABSTRACT

An optical pickup apparatus comprising: a laser diode; an objective lens made of a synthetic resin configured to focus laser light emitted from the laser diode to a signal recording layer of an optical disc; and a collimating lens having a diffraction grating and arranged in an optical path between the laser diode and the objective lens, the collimating lens being so moved in an optical axis direction of the laser light as to correct spherical aberration occurring in response to a change in temperature when performing a recording operation for the optical disc, and the collimating lens correcting by the diffraction grating chromatic aberration occurring when switching from the recording operation to a reproducing operation for the optical disc.

6 Claims, 2 Drawing Sheets

OPTICAL PICKUP APPARATUS

CROSS-REFERENCE TO RELATED APPLICATION

This application claims the benefit of priority to Japanese Patent Application No. 2008-066959, filed Mar. 17, 2008, of which full contents are incorporated herein by reference.

BACKGROUND OF THE INVENTION

1. Field of the Invention

The present invention relates to an optical pickup apparatus that executes an operation of reading a signal recorded in an optical disc or an operation of recording a signal in the optical disc with laser light.

2. Description of the Related Art

Optical disc devices has been widespread each of which is capable of a signal reading operation and signal recording operation by applying laser light emitted from an optical pickup apparatus to a signal recording layer of the optical disc.

The optical disc devices using optical discs called CDs or DVDs are available in general, however, optical discs whose recording densities are improved, that is, those using Blu-ray standard optical discs have recently been developed.

Infrared light with a wavelength of 780 nm is used as the laser light executing the operation of reading a signal recorded in a CD standard optical disc, and red light with a wavelength of 650 nm is used as the laser light executing the operation of reading a signal recorded in a DVD standard optical disc.

In contrast to cases of such CD-standard and DVD-standard optical discs, laser light with a short wavelength, or a blue-violet light with a wavelength of 405 nm, for example, is used as the laser light executing the operation of reading a signal recorded in a Blu-ray standard optical disc.

The thickness is 0.1 mm of a protective layer provided on an upper surface of the signal recording layer in the Blu-ray standard optical disc, and the numerical aperture is specified at 0.85 of an objective lens used for the operation of reading a signal from this signal recording layer.

For such an optical pickup apparatus compliant with the optical disc standard with improved recording density, strict optical characteristics are required to improve signal recording quality in accordance with improvement in the recording density.

The optical pickup apparatus is made up such that a driving current to be supplied to a laser diode can be controlled so as to be able to obtain a laser output suitable for reading a signal recorded in the optical disc or a laser output suitable for recording a signal in the optical disc. The above operation of controlling the laser output is performed such that a monitor signal, which is obtained from a photodetector for front monitor provided at a position where the laser light emitted forward from the laser diode is applied, is fed back to a driving circuit for supplying the driving current to the laser diode, as known.

If glass is used as material of an objective lens for focusing the laser light to the signal recording layer included in the optical disc, since it is not affected by temperature, signal recording characteristics and signal reproducing characteristics can be improved, however, there is a problem of high cost. As a method for solving such a problem, a method is generally performed of manufacturing an objective lens by injection-molding a synthetic resin.

The objective lens made of a synthetic resin has a problem that spherical aberration and chromatic aberration occur due to a change in temperature, and especially when the laser output is greatly changed as in the case of switching from a recording operation state to a reproducing operation state, a problem called mode hop occurs, which is a problem that a focal position of the objective lens is moved in response to a change in wavelength of the laser light, so that the focal point is deviated.

Such a phenomenon of deviation of the focal position is mainly caused by aberration called chromatic aberration which occurs in the objective lens due to a change in wavelength of the laser light, and when the focal position is deviated due to such a cause, a problem occurs that the operation of reproducing a signal recorded in the optical disc or the like cannot normally be performed. As a method for solving such a problem, a technology has been developed for improving the chromatic aberration by forming a diffraction grating at the objective lens (See Japanese Patent Laid-Open Publication No. 9-311271).

The above-mentioned Patent Document discloses the technology to correct the chromatic aberration by providing a diffraction grating at the objective lens, and in the optical pickup apparatus using the objective lens with a large numerical aperture such as the optical pickup apparatus for the Blu-ray standard optical disc, the objective lens with a small radius of curvature is used.

If a diffraction grating such as an annular diffraction grating is formed at an objective lens with a small radius of curvature, transmittance of the laser light is reduced, so that the intensity becomes insufficient of the laser light applied to the signal recording layer of the optical disc, which is a problem. Considering such reduction in laser light intensity, the size of a driving signal to be supplied to the laser diode needs to be increased, and thus, the heat generated from the laser diode is further increased so that the spherical aberration and chromatic aberration of the objective lens are increased, which is a problem.

SUMMARY OF THE INVENTION

An optical pickup apparatus according to an aspect of the present invention, comprises: a laser diode; an objective lens made of a synthetic resin configured to focus laser light emitted from the laser diode to a signal recording layer of an optical disc; and a collimating lens having a diffraction grating and arranged in an optical path between the laser diode and the objective lens, the collimating lens being so moved in an optical axis direction of the laser light as to correct spherical aberration occurring in response to a change in temperature when performing a recording operation for the optical disc, and the collimating lens correcting by the diffraction grating chromatic aberration occurring when switching from the recording operation to a reproducing operation for the optical disc.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
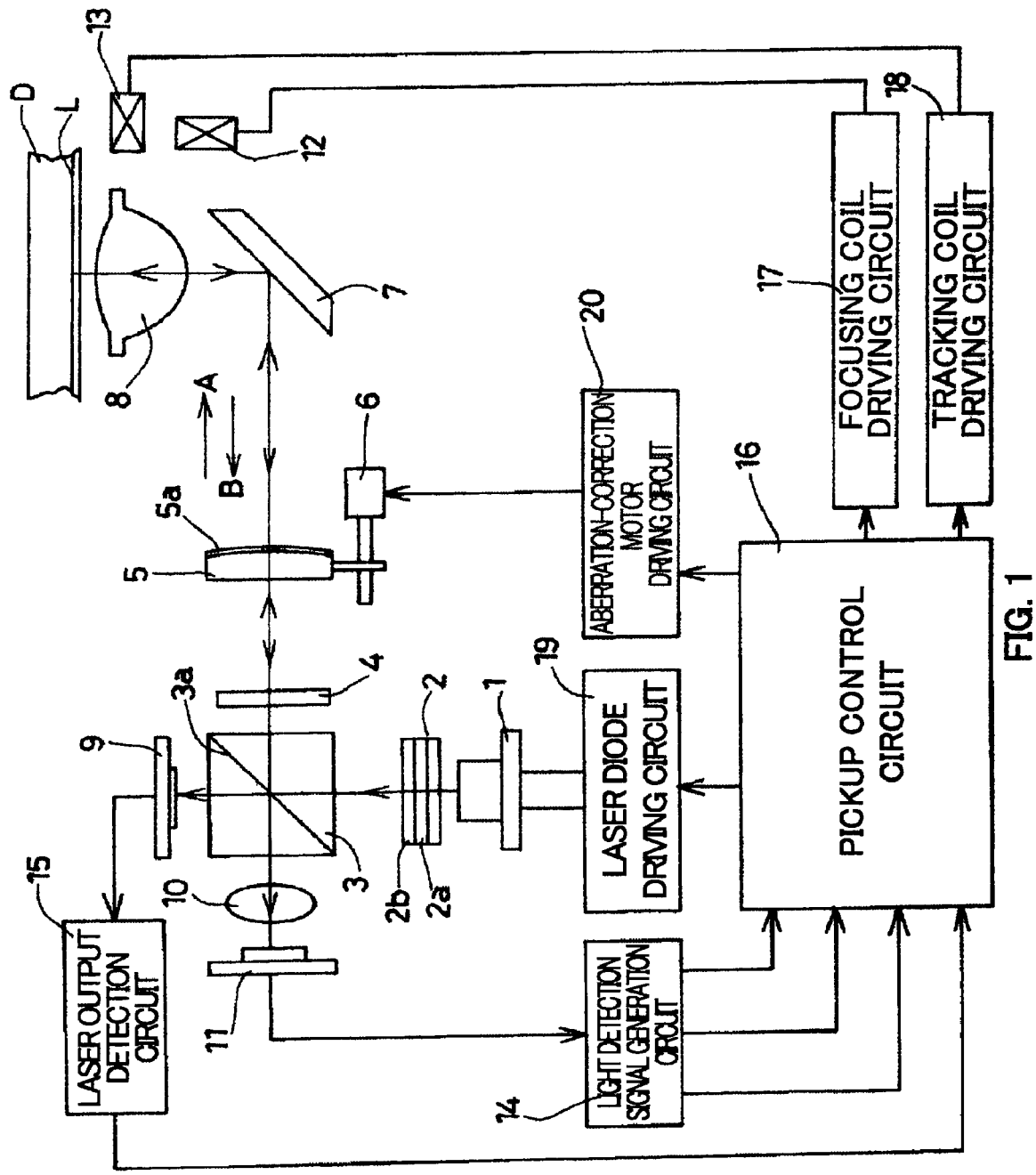
FIG. 1 is a diagram illustrating an optical pickup apparatus according to an embodiment of the present invention.

At least the following details will become apparent from descriptions of this specification and of the accompanying drawings.

An optical pickup apparatus according to an embodiment of the present invention includes a collimating lens that is disposed in an optical path between a laser diode and an objective lens made of a synthetic resin, that corrects spherical aberration by a movement operation in an optical axis direction, and that a diffraction grating for correcting chromatic aberration is formed on; and corrects the spherical aberration occurring in response to a change in temperature when performing a recording operation, by an operation of moving the collimating lens in the optical axis direction, and corrects the chromatic aberration occurring when switching from a recording operation state to a reproducing operation state, by the diffraction grating formed on the collimating lens.

The optical pickup apparatus according to an embodiment of the present invention performs the operation of moving the collimating lens in the optical axis direction by a motor.

The optical pickup apparatus according to an embodiment of the present invention uses a stepping motor as a motor, and a movement amount by rotation (rotation amount) of the stepping motor is set by the number of driving pulses.

In the optical pickup apparatus according to an embodiment of the present invention, a diffraction grating formed on the collimating lens is in an annular shape.

The optical pickup apparatus according to an embodiment of the present invention includes the collimating lens that is disposed in the optical path between the laser diode and the objective lens made of a synthetic resin, that corrects the spherical aberration by the movement operation in the optical axis direction, and that a diffraction grating for correcting the chromatic aberration is formed on; and corrects the spherical aberration occurring in response to a change in temperature when performing the recording operation, by the operation of moving the collimating lens in the optical axis direction, and corrects the chromatic aberration occurring when switching from the recording operation state to the reproducing operation state, by the diffraction grating formed on the collimating lens, that is, an operation of correcting the spherical aberration which gradually increases with a gradual increase of an environmental temperature as in the recording operation, is performed by the operation of moving the collimating lens, while an operation of correcting the chromatic aberration which occurs in response to such a rapid change in temperature as that in switching from the recording operation state to the reproducing operation state, is performed by the diffraction grating formed on the collimating lens, and thus, the operations of correcting the spherical aberration and chromatic aberration can be performed by an optimal correcting method.

Therefore, according to the optical pickup apparatus according to an embodiment of the present invention, operations required as an optical pickup apparatus can accurately be executed, such as an operation of recording a signal in a signal recording layer of an optical disc and an operation of reading a signal recorded in the signal recording layer.

In the optical pickup apparatus according to an embodiment of the present invention, the chromatic aberration occurring in response to a change in the environmental temperature is corrected by providing the diffraction grating on the collimating lens whose radius of curvature can be made greater as compared with that of the objective lens, and thus, there is an advantage that a diffraction grating does not need to be provided at the objective lens so that light intensity is not decreased.

In FIG. 1, a laser diode 1 emits laser light forward, which is blue-violet light with a wavelength of 405 nm, for example, and the laser light emitted from the laser diode 1 enters a diffraction grating 2 and the diffraction grating 2 includes a diffraction grating portion 2a that divides the laser light into a main beam, which is 0th order light, and two sub beams, which are +1st order diffracted light and −1st order diffracted light, and a half-wave plate 2b that converts the incident laser light into a linearly polarized light in an S direction, for example.

The laser light having passed through the diffraction grating 2 enters a polarization beam splitter 3, and the polarization beam splitter 3 includes a control film 3a that reflects most of the S-polarized laser light, allows a part of the laser light to be allowed to pass therethrough, and allows the laser light converted into a linearly polarized light in a P direction to pass therethrough.

A quarter-wave plate 4 is provided at a position where the laser light reflected by the control film 3a of the polarization beam splitter 3 is incident and the quarter-wave plate 4 converts the incident laser light from linearly polarized light to circularly polarized light, or to the contrary, from the circularly polarized light to the linearly polarized light. The laser light having passed through the quarter-wave plate 4 enters a collimating lens 5, and the collimating lens 5 converts the incident laser light into parallel light and is moved by an aberration correction motor 6 in an optical axis direction, that is, directions of arrows A and B. The spherical aberration caused based on a thickness of a protective layer of an optical disc D is corrected by an operation of moving the collimating lens 5 in the optical axis direction.

Figure 2:
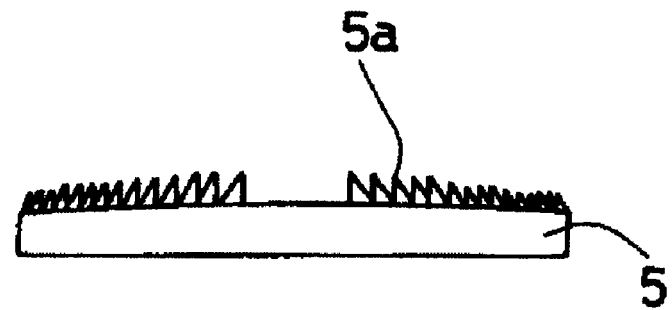
FIG. 2 is a sectional view of a collimating lens according to an embodiment of the present invention.
Figure 3:
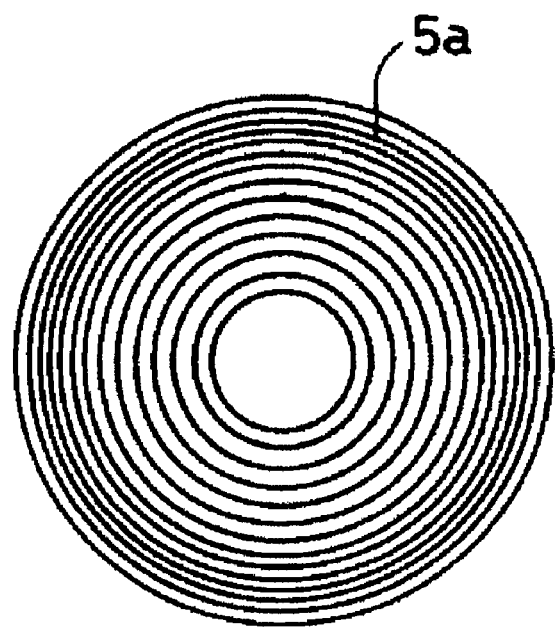
FIG. 3 is a plan view of a collimating lens according to an embodiment of the present invention.

At the collimating lens 5, diffraction grating 5a in a ring-shaped band shape as shown in FIGS. 2 and 3 is formed, and the collimating lens corrects chromatic aberration occurring in an objective lens, as will be described later, by the diffraction grating 5a. Such chromatic aberration occurs due to a change in wavelength of the laser light in response to a change in environmental temperature, and occurrence of the chromatic aberration adversely affects a focusing operation of the objective lens which focuses the laser light to a signal recording layer L included in the optical disc D.

A raising mirror 7 is provided at a position where the laser light having passed through the collimating lens 5 is incident and the raising mirror 7 is made up so as to reflect the incident laser light in a direction of the objective lens 8 made of a synthetic resin. A front monitor photodetector 9 is provided at a position where the laser light having passed through the control film 3a included in the polarization beam splitter 3 is applied, and is made up so as to output a signal according to a level of the applied laser light as a monitor signal.

In the above configuration, the laser beam emitted from the laser diode 1 is made incident on the objective lens 8 through the diffraction grating 2, the polarization beam splitter 3, the quarter-wave plate 4, the collimating lens 5, and the raising mirror 7, and then, is applied as a spot on the signal recording layer L of the optical disc D by the focusing operation of the objective lens 8, while the laser light applied to the signal recording layer L is reflected as return light.

The return light reflected from the signal recording layer L of the optical disc D is incident on the control film 3a of the polarization beam splitter 3 through the objective lens 8, the raising mirror 7, the collimating lens 5, and the quarter-wave plate 4. Since the return light incident on the control film 3a of the polarization beam splitter 3 as above has been converted into the linearly polarized light in the P direction by a phase change operation of the quarter-wave plate 4, the return light is not reflected by the control film 3a but is allowed to pass therethrough as control laser light.

The control laser light having passed through the control film 3a of the polarization beam splitter 3 enters a sensor lens 10 and the sensor lens 10 adds astigmatism to the control laser light to be applied to light receiving portions included in a photodetector 11 called PDIC. In the photodetector 11, known four-divided sensors, etc., are included and the photodetector 11 is made up so as to perform a signal generation operation accompanied by the operation of reading a signal recorded in the signal recording layer L of the optical disc D by an application operation of the main beam, an operation of generating a signal for performing a focusing control operation by an astigmatic method, and an operation of generating a signal for performing a tracking control operation by an application operations of the two sub beams.

The optical pickup apparatus according to an embodiment of the present invention is made up as mentioned above, and in such a configuration, the objective lens 8 is fixed to a lens holding frame (not shown) supported by four or six support wires on a base of the optical pickup apparatus so that movement operations can be performed in a perpendicular direction relative to a signal surface of the optical disc D, that is, a focusing direction, and in a radial direction of the optical disc D, that is, a tracking direction.

A focusing coil 12 is provided at the lens holding frame to which the objective lens 8 is fixed, and has a function of moving the objective lens 8 in the focusing direction in cooperation with a magnet fixed to the base. A tracking coil 13 is provided at the lens holding frame to which the objective lens 8 is fixed, and has a function of moving the objective lens 8 in the tracking direction in cooperation with the magnet fixed to the base.

A light detection signal generation circuit 14 generates: an RF signal, which is a signal obtained by the operation of reading a signal recorded in the signal recording layer of the optical disc D from a sensor making up the photodetector 11 and receiving the main beam; a focus error signal, which is a signal obtained from the sensor receiving the main beam by the focusing operation of the laser light; and a tracking error signal, which is a signal obtained from sensors receiving the sub beams by the tracking operation of the laser light.

A signal obtained from the front monitor photodetector 9 is input to a laser output detection circuit 15 and the laser output detection circuit 15 is made up so as to output a signal according to a level of the input signal as a monitor signal.

Various signals output from the light detection signal generation circuit 14 and the laser output detection circuit 15 and the like are input to a pickup control circuit 16 and the pickup control circuit 16 performs various control operations of the optical pickup apparatus on the basis of each signal. A focus control signal output from the pickup control circuit 16 on the basis of the focus error signal output from the light detection signal generation circuit 14 is input to a focusing coil driving circuit 17, and the focusing coil driving circuit 17 is made up so as to supply a driving signal to the focusing coil 12. A tracking control signal output from the pickup control circuit 16 on the basis of the tracking error signal output from the light detection signal generation circuit 14 is input to a tracking coil driving circuit 18, and the tracking coil driving circuit 18 is made up so as to supply a driving signal to the tracking coil 13.

A laser diode driving circuit 19 supplies a driving signal to the laser diode 1 and the laser diode driving circuit 19 is made up so as to adjust a laser output with a control signal output from the pickup control circuit 16 on the basis of a monitor signal obtained from the laser output detection circuit 15. An aberration-correction motor driving circuit 20 corrects spherical aberration by moving the collimating lens 5 in the optical axis direction by supplying a driving signal to the aberration correction motor 6, and the aberration-correction motor driving circuit 20 is made up so as to be controlled by the pickup control circuit 16.

The optical pickup apparatus according to an embodiment of the present invention is configured as mentioned above, and an operation thereof will hereinafter be described.

When the operation is performed of reading a signal recorded in the signal recording layer L included in the optical disc D, a driving control signal is supplied from the pickup control circuit 16 to each of the circuits making up the optical pickup apparatus. A driving signal for obtaining the laser output set in advance for performing an accurate signal reading operation is supplied from the laser diode driving circuit 19 to the laser diode 1, so that the laser light with a desired output is emitted from the laser diode 1.

The laser light emitted from the laser diode 1 enters the diffraction grating 2, to be divided into the main beam and the sub beams by the diffraction grating portion 2a included in the diffraction grating 2, and to be converted into the linearly polarized light in the S direction by the half-wave plate 2b. The laser light having passed through the diffraction grating 2 enters the polarization beam splitter 3, and most of the laser light is reflected by the control film 3a included in the polarization beam splitter 3, while a part of the laser light is allowed to pass therethrough.

The laser light reflected by the control film 3a included in the polarization beam splitter 3 enters the quarter-wave plate 4 to be converted from the linearly polarized light into the circularly polarized light, and then, enters the collimating lens 5. The laser light incident on the collimating lens 5 is converted into the parallel light, to made incident on the raising mirror 7.

The laser light incident on the raising mirror 7 is reflected by the raising mirror 7 in a direction of the objective lens 8. The laser light reflected by the raising mirror 7 enters the objective lens 8, and the focusing operation by the objective lens 8 is performed.

The focusing operation of the laser light to the signal recording layer L by the objective lens 8 is carried out by performing an operation to move the objective lens 8 closer to the optical disc D from a position away from the optical disc D, for example. Such an operation of moving the objective lens 8 is carried out by supplying the driving signal from the focusing coil driving circuit 17 to the focusing coil 12, and when the focusing operation to the signal recording layer L is carried out, the laser light reflected by the signal recording layer L enters the objective lens 8 from the side of the optical disc D as the return light.

The return light incident on the objective lens 8 enters the control film 3a included in the polarization beam splitter 3 through the raising mirror 7, the collimating lens 5, and the quarter-wave plate 4. Since the return light incident on the control film 3a has been converted by the quarter-wave plate 4 into the linearly polarized light in the P direction, the light is not reflected by the control film 3a but all the light is allowed to pass therethrough as control laser light.

The control laser light which is the return light having passed through the control film 3a enters the sensor lens 10, and then, is added with astigmatism by the sensor lens 10 to be applied to a sensor portion included in the photodetector 11. As the result of irradiation of the control laser light to the photodetector 11, a detection signal can be obtained on the basis of a position and change in shape of applied spot of the main beam, from the four-divided sensor, which is the light receiving portion for the main beam, and the like included in the photodetector 11, and similarly, a detection signal can be obtained on the basis of positions and changes in shapes of applied spots of the sub beams, from the four-divided sensors, which are the respective light receiving portions for the sub beams, and the like included in the photodetector 11.

In such a state, the focus error signal and the tracking error signal generated from the light detection signal generation circuit 14 on the basis of the detection signal obtained from the photodetector 11 are input to the pickup control circuit 16. When the focus error signal and tracking error signal are input to the pickup control circuit 16, a control signal on the basis of each of the error signal is output to the focusing coil driving circuit 17 and the tracking coil driving circuit 18. As a result, since a control signal is supplied to the focusing coil 12 from the focusing coil driving circuit 17, the operation of moving the objective lens 8 is carried out in the focusing direction with the focusing coil 12, so that the focusing control operation can be performed of focusing the laser light to the signal recording layer L. Since a control signal is supplied to the tracking coil 13 from the tracking coil driving circuit 18, the operation of moving the objective lens 8 is carried out in the tracking direction with the tracking coil 13, so that the tracking control operation can be performed of making the laser light follow a signal track provided in the signal recording layer L.

Since the focusing control operation and the tracking control operation are carried out in the optical pickup apparatus as mentioned above, the operation can be performed of reading a signal recorded in the signal recording layer L of the optical disc D. A reproduction signal obtained by such a reading operation can be obtained as information data by demodulating an RF signal generated from the light detection signal generation circuit 14 in a known way.

The operation is performed of reading a signal recorded in the signal recording layer L included in the optical disc D as mentioned above, and in a state of performing such a reading operation, the collimating lens 5 provided as aberration correcting means is made up so as to be moved to an operation position where spherical aberration with respect to the signal recording layer L is minimized by a driving signal supplied to the aberration correction motor 6 from the aberration-correction motor driving circuit 20. Such an operation position setting operation may be performed to set the operation position at such a position that a value of jitter included in the reproduction signal becomes an optimal value or a position where a level of an RF signal becomes the maximum, for example.

By performing the operation of moving the collimating lens 5 to the operation position as mentioned above, the operation can be performed of reading a signal recorded in the signal recording layer L included in the optical disc D in an optimal state.

While the above-mentioned signal reading operation is performed, a driving signal, by which a desired laser output can be obtained, is supplied to the laser diode 1 from the laser diode driving circuit 19 and a monitor signal output from the laser output detection circuit 15 on the basis of a signal obtained from the front monitor photodetector 9 is input to the pickup control circuit 16.

When the monitor signal output from the laser output detection circuit 15 is input to the pickup control circuit 16 as above, a control signal on the basis of a level of the monitor signal is supplied to the laser diode driving circuit 19 from the pickup control circuit 16. Therefore, if control is performed such that a level of a driving signal supplied to the laser diode driving circuit 19 from the pickup control circuit 16 becomes a predetermined value, an output of the laser light emitted from the laser diode 1 can be automatically controlled so as to become a desired level. The above operation is called an automatic output control operation of laser light.

The optical pickup apparatus according to an embodiment of the present invention is configured as mentioned above, and the aberration correcting operation according to an embodiment of the present invention will hereinafter be described.

As mentioned above, the laser light emitted from the laser diode 1 enters the objective lens 8 through an optical path formed by the diffraction grating 2, the polarization beam splitter 3, the quarter-wave plate 4, the collimating lens 5, and the raising mirror 7, to be applied to the signal recording layer L of the optical disc D as a desired spot by the focusing operation with the objective lens 8.

The laser light applied to the signal recording layer L of the optical disc D by the above-mentioned operation is reflected by the signal recording layer L. The return light, which is the laser light reflected from the signal recording layer L as above, is applied to the photodetector 11 as the control laser light through the optical path made up of the objective lens 8, the raising mirror 7, the collimating lens 5, the quarter-wave plate 4, the polarization beam splitter 3, and the sensor lens 10.

When the control laser light is applied to the photodetector 11 as above, the above-mentioned various signals are obtained from the photodetector 11, and thus, by using such signals, the operation of reading a signal, the focusing control operation, and the tracking control operation can normally be performed in the optical pickup apparatus.

A driving signal is supplied to the laser diode 1 from the laser diode driving circuit 19, and in a case of the recording operation, a driving signal is supplied to the laser diode 1, which has an amplitude several ten times greater as compared with that in a case of the operation of reading a signal, for example. As a result, in the recording operation, an amount of heat generated from the laser diode 1 and the laser diode driving circuit 19 is increased, and a temperature inside the optical pickup apparatus, that is, the environmental temperature is raised.

When such an environmental temperature is raised, the objective lens 8 made of a synthetic resin is expanded to be deformed so that focusing properties thereof are changed, and a wavelength of the laser light emitted from the laser diode 1 is changed. If the wavelength of the laser light changes with a change in the environmental temperature, refractive properties of the objective lens 8 are changed so that spherical aberration or chromatic aberration occurs, and thus, a position for focusing the laser light to the signal recording layer L, that is, a focusing position, is deviated.

When the recording operation is started, the environmental temperature is raised with the passage of the recording operation time. However, since the environmental temperature gradually changes, spherical aberration or chromatic aberration is gradually increased. Since the aberrations change to be gradually increased in such a case, the optical pickup apparatus according to an embodiment of the present invention is made up so as to correct the aberrations by moving the collimating lens 5 in the optical axis direction.

Since the spherical aberration is gradually increased with change in the environmental temperature in a state of the recording operation as mentioned above, the operation is performed of moving the collimating lens 5 to a position where the level of the RF signal, which is the reproduction signal generated from the light detection signal generation circuit 14 on the basis of a signal obtained from the photodetector 11, becomes the maximum, or to a position where the value of jitter included in the reproduction signal becomes the optimal value. The operation of moving the collimating lens 5 due to such an aberration correction is carried out by supplying a driving signal from the aberration-correction motor driving circuit 20 to the aberration correction motor 6.

The operation of moving the collimating lens 5 is carried out by a rotational operation of the aberration correction motor 6, and if a stepping motor is used as the aberration correction motor 6, a position of the collimating lens 5 to be moved can be specified with accuracy. That is, the stepping motor has a characteristic that since it is driven to rotate by a pulsed driving signal, a rotation amount can accurately be set by the number of pulses (driving pulses) supplied as driving signals. Therefore, if a relationship between an amount of moving the collimating lens 5 and an amount of an aberration correction is stored in a memory (not shown), etc., the amount of moving the collimating lens 5 can accurately correspond to the increase of the spherical aberration, and thus, the operation of correcting the spherical aberration can be performed with accuracy.

The operation is performed as above of correcting the spherical aberration which occurs in the case where the environmental temperature changes gradually, and an operation will hereinafter be described of correcting the chromatic aberration which occurs in the case where the environmental temperature changes rapidly.

The operations when the environmental temperature changes rapidly include an operation of switching from the recording operation state to the reproducing operation state, for example. If such a switching operation is carried out, the amplitude of the driving signal supplied to the laser diode 1 is decreased instantaneously. As a result, heat generated from the laser diode 1 is decreased, so that the temperature of the laser diode 1 greatly changes and the wavelength of the laser light changes rapidly.

When the above operation is performed of switching from the recording operation state to the reproducing operation state, the wavelength is changed of the laser light emitted from the laser diode 1, and thus, the chromatic aberration occurs in response to a change in the refractive index of the objective lens 8. If the chromatic aberration occurs in the objective lens 8, a focusing point, i.e., a focal position of the objective lens 8 changes, so that a focus is deviated from the signal recording layer L, and such a state is a so-called defocused state.

In the optical pickup apparatus according to an embodiment of the present invention, the diffraction grating 5a for correcting such chromatic aberration is provided at the collimating lens 5. This diffraction grating 5a is formed in an annular shape on a surface of the objective lens 8 of the collimating lens 5 as shown in FIG. 3. The diffraction grating 5a in the annular shape is also formed in a sawtooth shape in cross section, where each sawtooth shape is defined by a line on a collimating lens 5 center side which stands up in substantially a vertical manner on the surface of the collimating lens 5, and a line on a side opposite to the collimating lens 5 center side which is inclined, as shown in FIG. 2. That is, the diffraction grating is formed in such a shape as to correct the chromatic aberration which occurs in response to a change in the wavelength of the laser light. In specific, the collimating lens 5, which is a convex lens and dioptric system, has a characteristic that a refracting angle becomes smaller and a focal position becomes farther as a wavelength of light becomes longer. On the other hand, the diffraction grating 5a has a characteristic that a refracting angle becomes greater and a focal position becomes closer as a wavelength of light becomes longer. That is, the collimating lens 5 and the diffraction grating 5a have opposite image formation characteristics with each other as to difference in wavelength of light, and thus, the collimating lens 5 and the diffraction grating 5a are combined so that the chromatic aberrations can be canceled with each other.

Therefore, even if the environmental temperature rapidly changes due to the operation of switching from the recording operation state to the reproducing operation state so that the wavelength of the laser light changes, the chromatic aberration which occurs in response to a change in the wavelength of the laser light is corrected by the diffraction grating 5a formed on the collimating lens 5, and thus, the focusing point of the objective lens 8 is not deviated but the laser light spot can accurately be formed on the signal recording layer L.

According to the optical pickup apparatus of an embodiment of the present invention as mentioned above, the spherical aberration which occurs in response to a gradual change in the environmental temperature is corrected by the operation of moving the collimating lens 5 in the optical axis direction, while the chromatic aberration which occurs in response to a rapid change in the environmental temperature is corrected by the diffraction grating 5a provided at the collimating lens 5, so that the aberration correcting operation can be performed according to occurrence factors of the aberrations.

In an embodiment of the present invention, although the annular diffraction grating 5a is formed on the collimating lens 5, the shape is not limited but can variously be changed. Although the annular diffraction grating 5a is formed on the surface on an objective lens 8 side of the collimating lens 5, the diffraction grating may be provided on a side opposite to the above or both sides of the collimating lens 5.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:
1. An optical pickup apparatus comprising:
    a laser diode;
    an objective lens made of a synthetic resin, the objective lens configured to focus laser light emitted from the laser diode to a signal recording layer of an optical disc;
    a collimating lens arranged in an optical path between the laser diode and the objective lens, wherein:
        the collimating lens has a radius of curvature greater than a radius of curvature of the objective lens; and
        an annular diffraction grating is formed on a surface of the collimating lens farthest from the objective lens, the annular diffraction grating configured to correct chromatic aberration that occurs in response to a change in a refractive index of the objective lens with a change in wavelength of the laser light, and a mirror arranged in the optical path between the collimating lens and the objective lens, the mirror reflecting the laser light passed through the collimating lens in a direction of the objective lens; wherein:

the collimating lens is moved in an optical axis direction of the laser light to correct for spherical aberration occurring in response to a change in temperature when performing a recording operation for the optical disc, and the collimating lens corrects, due to the annular diffraction grating, chromatic aberration occurring when switching from the recording operation to a reproducing operation for the optical disc.

2. The optical pickup apparatus according to claim 1, wherein the collimating lens is moved in the optical axis direction in accordance with a rotational operation of a motor.

3. The optical pickup apparatus according to claim 2, wherein the motor is a stepping motor; and a rotation amount of the stepping motor is set by the number of driving pulses corresponding to an amount of moving the collimating lens in the optical axis direction.

4. The optical pickup apparatus according to claim 1, wherein:

the intensity of the laser light emitted from the laser diode onto the signal recording layer of the optical disc is maintained.

5. The optical pickup apparatus according to claim 1, wherein the annular diffraction grating is formed on a surface of the collimating lens closest to the objective lens and on the surface of the collimating lens farthest from the objective lens.

6. The optical pickup apparatus according to claim 1, wherein the annular diffraction grating is formed on the surface of the collimating lens in a sawtooth shape.

* * * * *